United States Patent
Eo et al.

(10) Patent No.: US 9,353,840 B2
(45) Date of Patent: May 31, 2016

(54) AUTOMATED MANUAL TRANSMISSION FOR VEHICLE

(71) Applicant: Hyundai Motor Company, Seoul (KR)

(72) Inventors: Soon Ki Eo, Ansan-si (KR); Dong Soo Lee, Seoul (KR); Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 539 days.

(21) Appl. No.: 13/737,702

(22) Filed: Jan. 9, 2013

(65) Prior Publication Data

US 2013/0244819 A1    Sep. 19, 2013

(30) Foreign Application Priority Data

Mar. 13, 2012    (KR) .................. 10-2012-0025354

(51) Int. Cl.
*F16H 37/00* (2006.01)
*F16H 37/02* (2006.01)

(52) U.S. Cl.
CPC ......... *F16H 37/021* (2013.01); *Y10T 74/19219* (2015.01)

(58) Field of Classification Search
CPC .................................................. F16H 37/021
USPC ................... 474/25, 30, 31; 74/325, 329, 333
See application file for complete search history.

(56) References Cited

U.S. PATENT DOCUMENTS 4,116,080 A * 9/1978 Berens ............................ 474/21
4,241,618 A * 12/1980 Smirl ............................. 477/39
5,086,671 A * 2/1992 Oshidari ....................... 477/41

OTHER PUBLICATIONS

Prof. Dr. Kim, Chae-Hwi, Automated manual transmission, Advanced automotive chassis, Sep. 1, 2009, pp. 87-94, vol. 1, GoldenBell.

* cited by examiner

*Primary Examiner* — William C Joyce
(74) *Attorney, Agent, or Firm* — Morgan, Lewis & Bockius LLP

(57) ABSTRACT

An automated manual transmission apparatus for a vehicle, may include a shifting unit equipped with a plurality of shifting mechanisms that implement different gear ratios between an input shaft and an output shaft, and a continuous transmission mechanism that may be disposed between the output shaft and a power supply, wherein the continuous transmission mechanism selectively supplies power to the input shaft of the shifting unit and selectively transmits power from the power supply to the output shaft with a continuous transmission gear ratio.

7 Claims, 6 Drawing Sheets

AUTOMATED MANUAL TRANSMISSION FOR VEHICLE

CROSS-REFERENCE TO RELATED APPLICATION

The present application claims priority to Korean Patent Application No. 10-2012-0025354 filed on Mar. 13, 2012, the entire contents of which are incorporated herein by reference.

BACKGROUND OF THE INVENTION

1. Field of the Invention

The present disclosure relates to an automated manual transmission. More particularly, it relates to the configuration of an automated manual transmission which makes it possible to improve non-smooth shifting, such as pulling, when shifting.

2. Description of Related Art

Automated manual transmissions are automatically shifted by an actuator while a vehicle travels so that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously cut even during shifting that is automatically performed by an actuator, and as a result, torque decreases and non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

Various aspects of the present invention are directed to providing an automated manual transmission for a vehicle that can improve the commercial value of a vehicle by preventing non-smooth shifting to achieve smooth and stable shifting response, by allowing specific power to be transmitted to the driving wheels in shifting while using the mechanism of a manual transmission, which necessarily connects power after instantaneously cutting the power for shifting in the related art, to prevent reduction of torque generated in shifting.

In an aspect of the present invention, an automated manual transmission apparatus for a vehicle may include a shifting unit equipped with a plurality of shifting mechanisms that implement different gear ratios between an input shaft and an output shaft, and a continuous transmission mechanism that is disposed between the output shaft and a power supply, wherein the continuous transmission mechanism selectively supplies power to the input shaft of the shifting unit and selectively transmits power from the power supply to the output shaft with a continuous transmission gear ratio.

The continuous transmission mechanism may include a driving pulley connected to the power supply, a belt engaged to the driving pulley and transmitting a rotational force of the driving pulley, a driven pulley engaged to the belt and receiving the rotational force from the driving pulley through the belt, and a pulley ratio-changing unit that continuously changes the diameter of the driving pulley and the diameter of the driven pulley which are in contact with the belt.

A power control mechanism is disposed between the driven pulley and the output shaft to connect or cut the power.

A driving gear transmitting the power to the output shaft is fitted on a first rotary shaft of the driven pulley, a driven gear fitted on the output shaft is engaged with the driving gear, and the power control mechanism connects or cuts the power between the driven pulley and the driving gear, on the first rotary shaft of the driven pulley.

A clutch that selectively transmits the power from the power supply to the input shaft is disposed between the input shaft and the power supply.

The clutch may have a clutch disc disposed inside the driving pulley to control the power from the power supply.

The driving pulley and the driven pulley respectively may include a pair of a fixed pulley that is restricted in an axial movement thereof and a movable pulley that is allowed to move in an axial direction thereof with respect to the corresponding fixed pulley, and the pulley ratio-changing unit continuously changes the diameters of the driving pulley and the driven pulley that are in contact with the belt by moving each movable pulley of the driving pulley and the driven pulley along the axial direction of the each movable pulley.

The pulley ratio-changing unit may include a control lever that may have a second rotary shaft between the driving pulley and the driven pulley and moves the each movable pulley of the driving pulley and the driven pulley along the axial direction thereof while rotating about the second rotary shaft, a feed screw that is engaged with the control lever and moves the control lever about the second rotary shaft, and a control motor that is fixed to the feed screw and rotates the feed screw.

The pulley ratio-changing unit is a hydraulic power supply that supplies hydraulic pressure to the each movable pulley of the driving pulley and the driven pulley such that the each movable pulley is moved in the axial direction thereof by the hydraulic force.

The shifting mechanism of the shifting unit is implemented by a synchro-mesh type in which the shifting mechanism is engaged after synchronization by using a key and a synchronizer ring.

The shifting mechanism of the shifting unit is implemented by a dog clutch.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
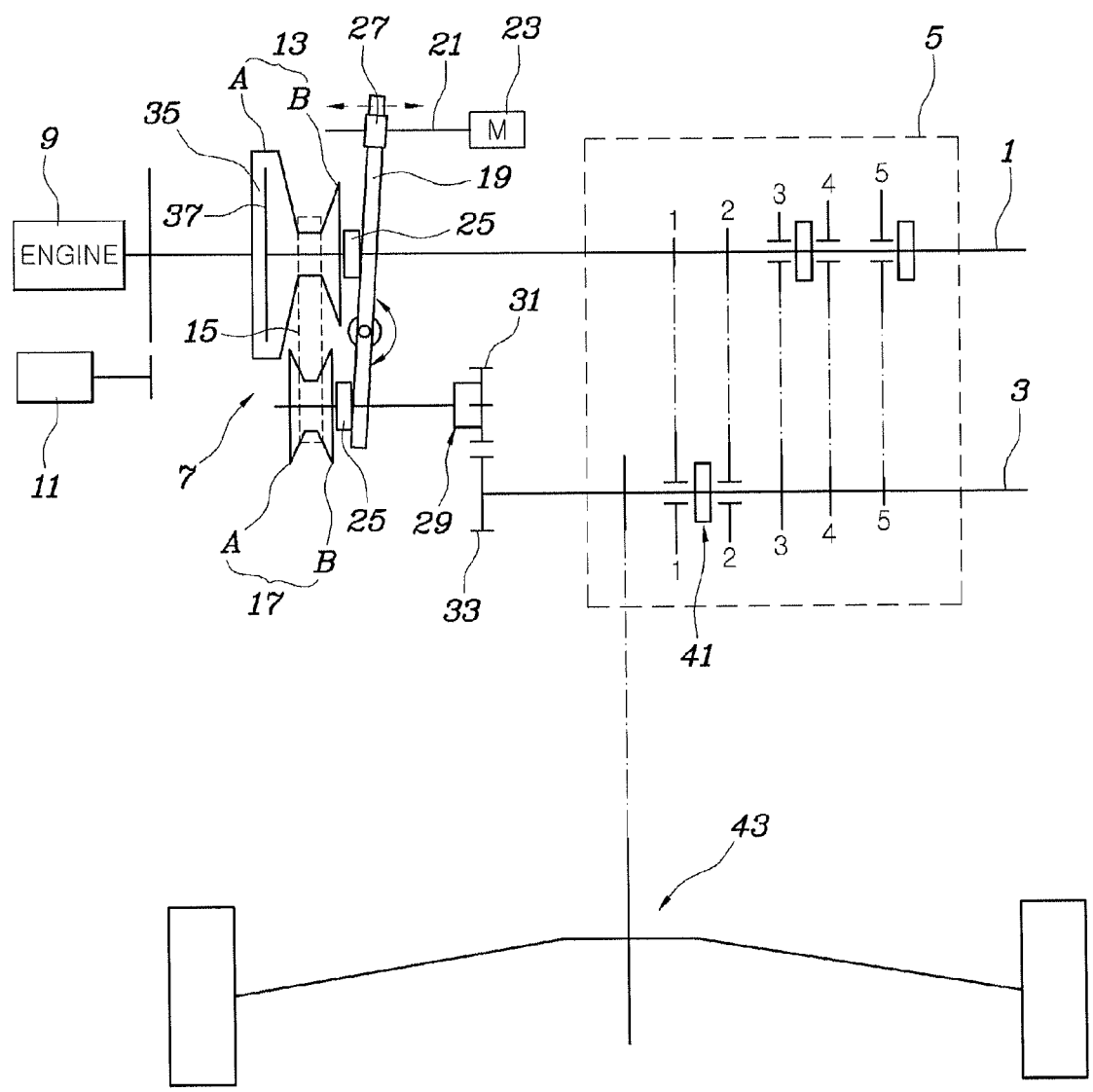
FIG. 1 is a view showing the configuration of an automated manual transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Referring to FIG. 1, an automated manual transmission for a vehicle according to an exemplary embodiment of the present invention includes, a shifting unit 5 equipped with a plurality of shifting mechanisms that implement different gear ratios between an input shaft 1 and an output shaft 3, a continuous transmission mechanism 7 that is disposed between the output shaft 3 and a power supply that supplies power to the input shaft 1 of the shifting unit 5 and transmits power from the power supply to the output shaft 3 with a continuous transmission gear ratio.

That is, the shifting unit 5 having the shifting mechanism of common manual transmission of the related art is implemented to be able to prevent reduction of torque due to cutting of power in shifting by allowing the continuous transmission mechanism 7 to receive power in parallel from the power supply and to continuously supply the power to the output shaft 3, not through the input shaft 1, when the shifting unit 5 is operated.

The power supply may be an engine 9 that is an internal combustion engine, as in the exemplary embodiment, and a start motor 11 for starting an engine is connected to the engine 9.

In the exemplary embodiment, the continuous transmission mechanism 7 includes, a driving pulley 13 connected to a rotary shaft of the power supply, a belt 15 transmitting a rotational force of the driving pulley 13, a driven pulley 17 receiving the rotational force from the driving pulley 13 through the belt 15, a pulley ratio-changing unit that can continuously change the diameter of the driving pulley 13 and the diameter of the driven pulley 17 which are in contact with the belt 15.

That is, it is possible to transmit the rotational force of the driving pulley 13 to the driven pulley 17 with a continuous transmission gear ratio by complementarily changing the diameter of the driving pulley 13 and the diameter of the driven pulley 17 such that the ratio of the contact diameter of the driving pulley 13 and the belt 15 and the contact diameter of the driven pulley 17 and the belt 15, with the belt 15 having a predetermined length wound, is changed continuously.

The driving pulley 13 and the driven pulley 17 are each composed of a pair of a fixed pulley A that is restricted in movement in the axial direction of the rotary shaft and a movable pulley B that is allowed to move in the axial direction of the rotary shaft with respect to the fixed pulley A, and the pulley ratio-changing unit continuously changes the diameters of the driving pulley 13 and the driven pulley 17 that are in contact with the belt 15 by moving the movable pulleys B of the driving pulley 13 and the driven pulley 17 straight in the axial direction of the rotary shafts.

In the exemplary embodiment, the pulley ratio-changing unit includes, a control lever 19 that has a rotary shaft 51 between the driving pulley 13 and the driven pulley 17 and moves the movable pulley B of the driving pulley 13 and the movable pulley B of the driven pulley 17 straight in the axial direction of the rotary shaft while rotating about the rotary shaft, a feed screw that is connected to rotate the control lever 19 about the rotary shaft while rotating, and a control motor 23 that rotates the feed screw 21.

Obviously, a connecting member 25 that connects the control lever 19 with the movable pulleys B and allows rotation of the control lever 19 to be converted into straight motion of the movable pulleys B in the axial direction of the rotary shaft is disposed between the control lever 19 and the movable pulleys B of the driving pulley 13 and the driven pulley 17, a converting member 27 that connects the control lever 19 with the feed screw 21 and converts rotation of the feed screw 21 into rotation of the control lever 19 is also disposed between the feed screw 21 and the control lever 19, and the connecting member 25 and the converting member 27 be implemented by a guide and a slot or a screw of the related art.

Meanwhile, the pulley ratio-changing unit, unlike the above, may be implemented by a hydraulic power supply that supplies hydraulic pressure to the movable pulley B of the driving pulley 13 and the movable pulley B of the driven pulley 17 such that the movable pulleys B are moved straight in the axial directions of the shafts by the hydraulic force, in which the mechanism of a continuously variable transmission using a belt and pulleys in the related art may be used.

Further, the continuous transmission mechanism may be replaced by the mechanisms of various continuously variable transmissions of the related art, and for example, a toroidal continuously variable transmission of the related art may be used.

Meanwhile, a power control mechanism 29 is disposed between the driven pulley 17 and the output shaft 3 to connect or cut the power.

In the exemplary embodiment, a driving gear 31 transmitting power to the output shaft 3 is fitted on the rotary shaft 53 of the driven pulley 17, a driven gear 33 engaged with the driving gear 31 is fitted on the output shaft 3, and the power control mechanism 29 can connect or cut the power between the driven pulley 17 and the driving gear 31, on the rotary shaft of the driven pulley 17.

Obviously, unlike the above, another configuration may be possible such as that the power control mechanism 29 is disposed at the output shaft 3 and the power control mechanism 29 may be appropriately selected from a friction clutch, a dog clutch, a synchro-mesh device, a friction band, a magnetic clutch, and the like.

A clutch 35 that selectively transmits the power from the power supply to the input shaft 1 is disposed between the input shaft 1 and the power supply.

In the exemplary embodiment, the clutch 35 has a compact configuration with a clutch disc 37 disposed inside the driving pulley 13 to control the power from the power supply in order to occupy as small space as possible.

The shifting mechanism of the shifting unit 5 is implemented by a synchro-mesh type in which it is engaged after synchronization by using a key and a synchronizer ring, or by a dog clutch, but it is more preferable to use a synchro-mesh type shifting mechanism that can minimize a power-cutting time and is most generally used at the present time, or other shifting mechanisms may be used, and the shifting mechanisms are the same in that it is necessary to cut the power inputted to the input shaft when shifting and torque is correspondingly decreased in shifting.

In the exemplary embodiment shown in FIGS. 1 to 6, the shifting unit 5 is provided as a synchro-mesh type shifting mechanism and has first stage to fifth stage and an R-range.

Figure 4:
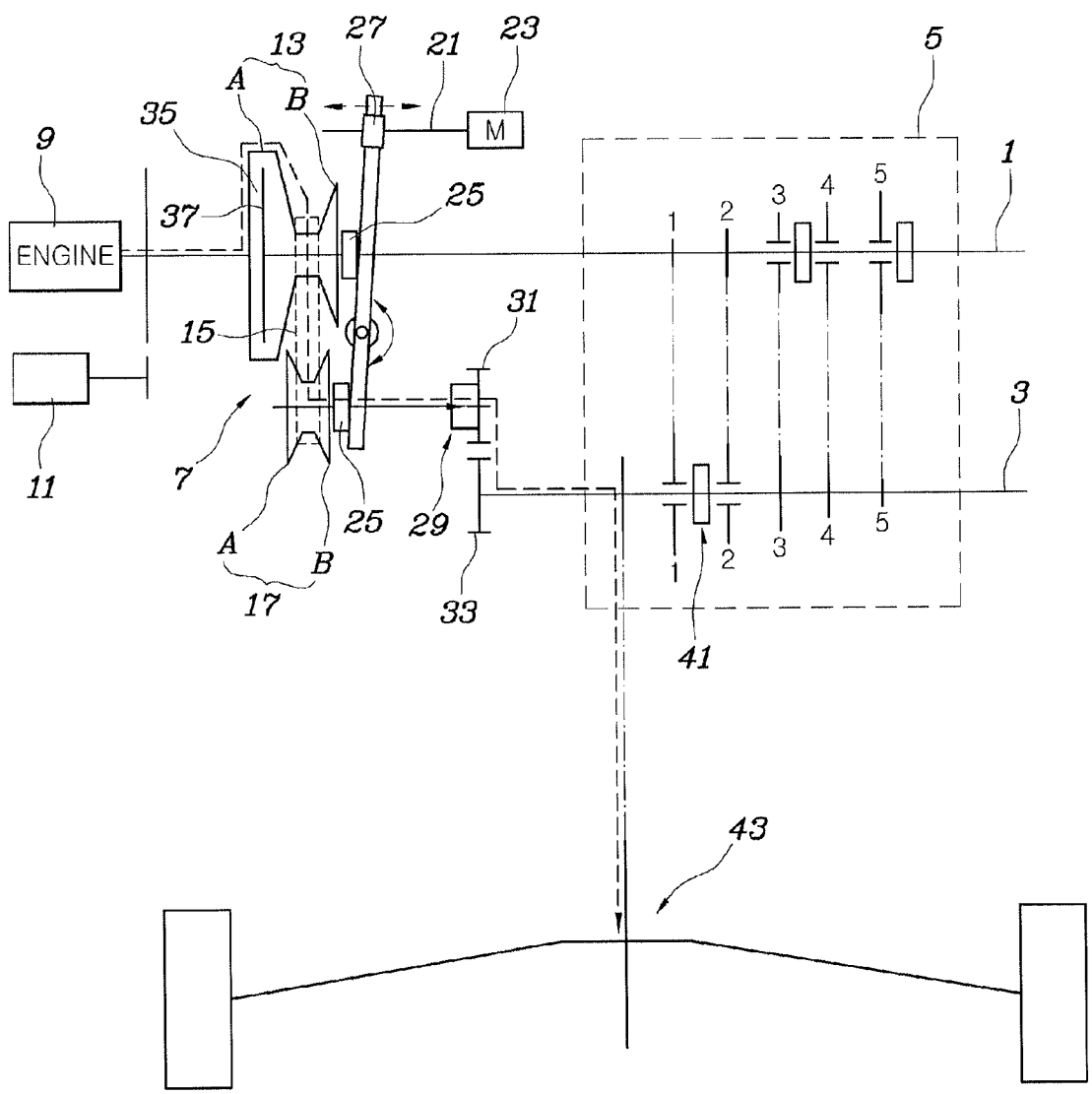
FIG. 4 is a view illustrating power transmission when the transmission is shifted from the first stage to the second stage in FIG. 1.
Figure 5:
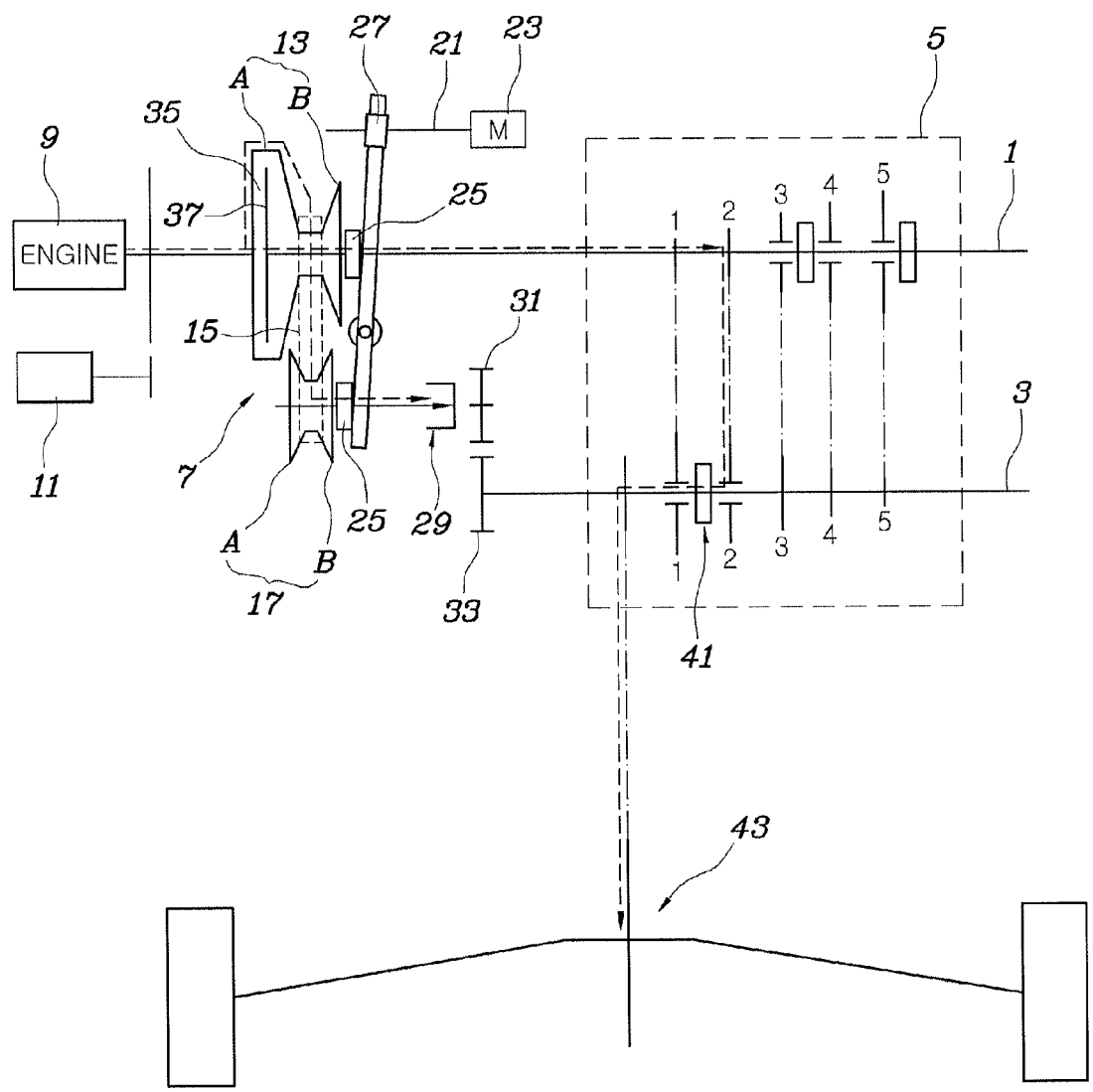
FIG. 5 is a view illustrating power transmission when a vehicle travels in the second stage in FIG. 1.
Figure 6:
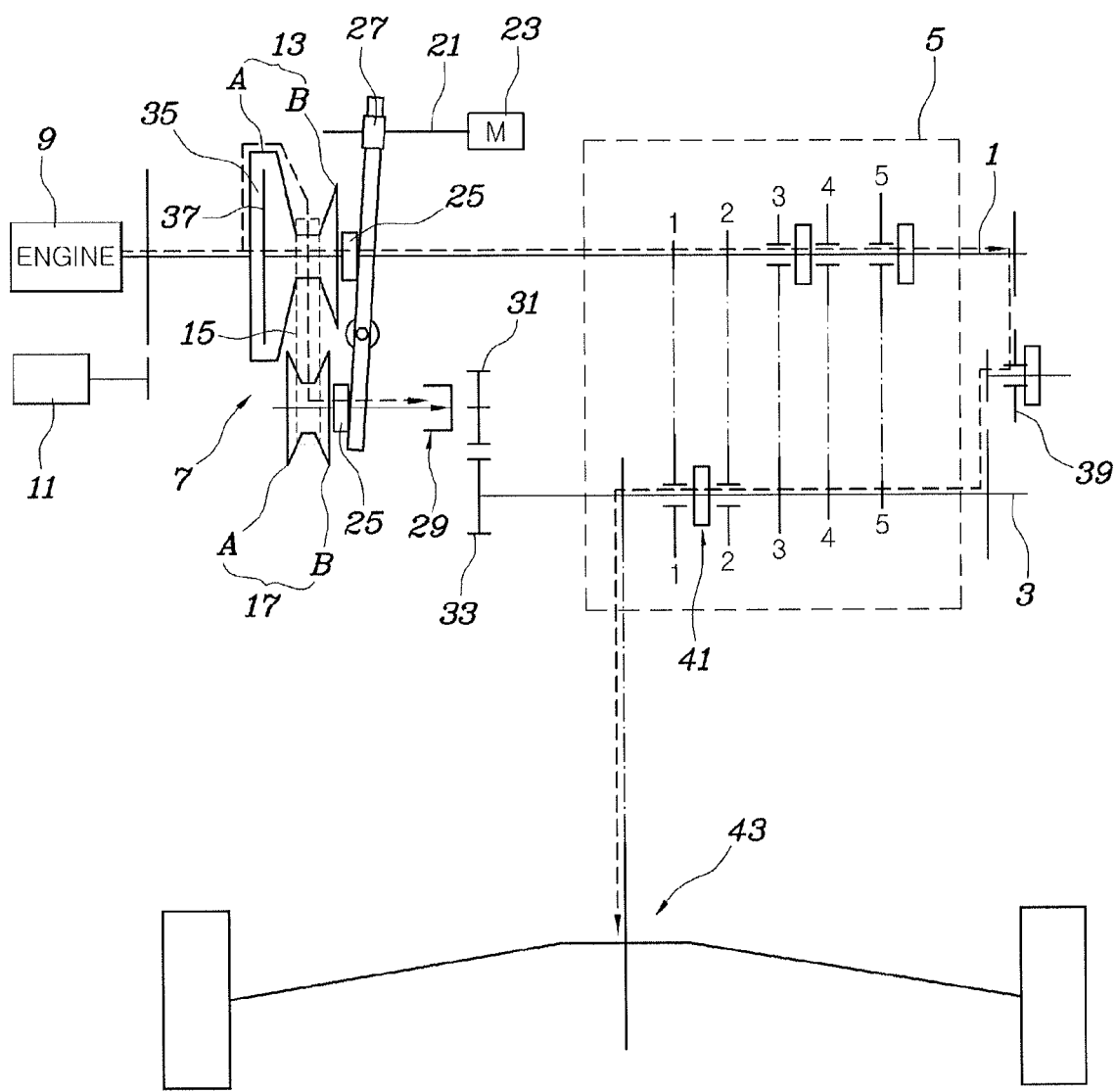
FIG. 6 is a view illustrating power transmission when a vehicle travels with an R-range in FIG. 1.

The operation of the present invention having the above configuration is described hereafter with reference to FIGS. 2 to 6. For reference, FIG. 6 illustrate when a vehicle travels in an R-range for reverse and further shows a reverse idler gear 39, which is not shown in FIGS. 1 to 5.

Figure 2:
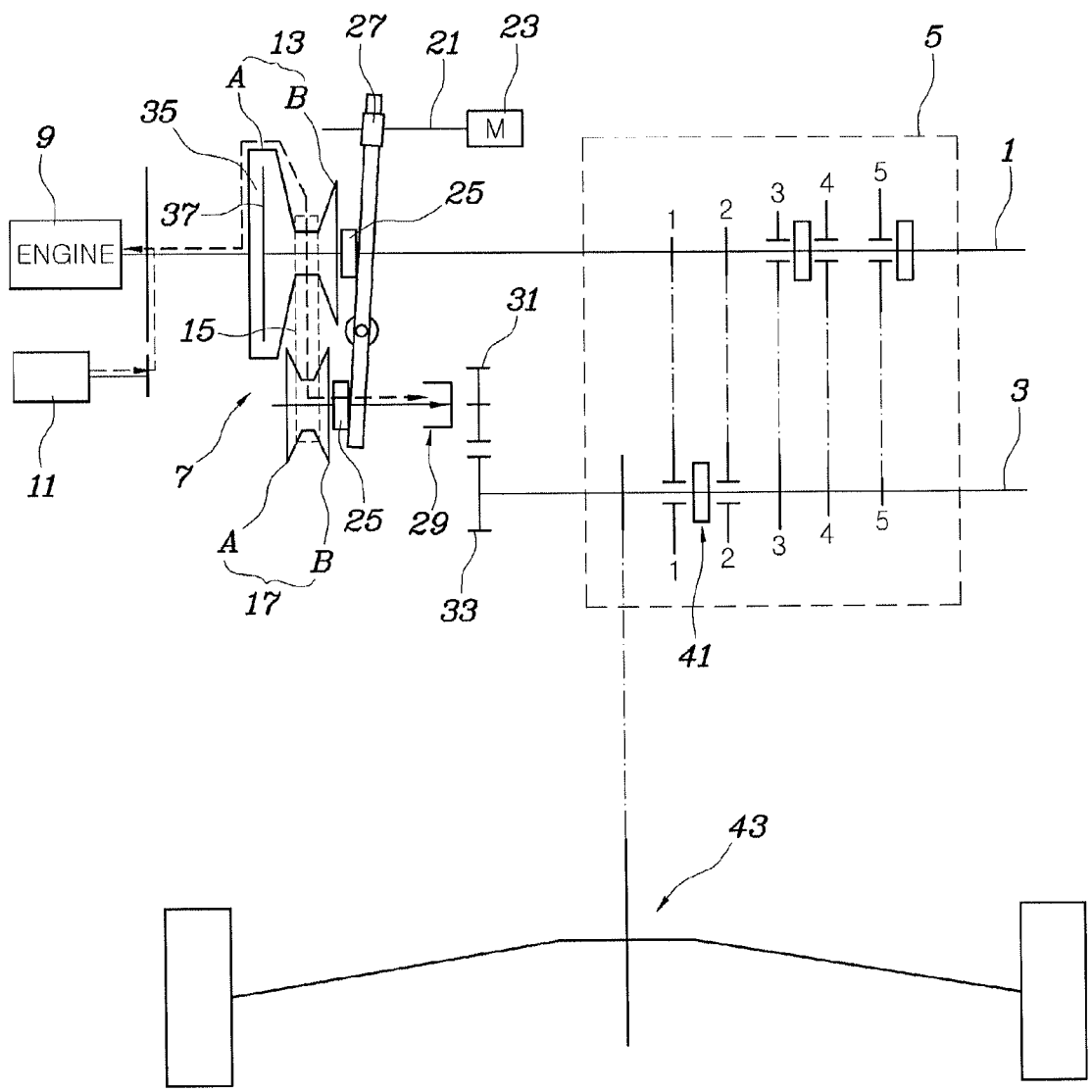
FIG. 2 is a view illustrating power transmission when the engine is started in FIG. 1.

FIG. 2 shows when an engine is started, in which both the clutch 35 and the power control mechanism 29 are disengaged and the engine 9 is cranked by the start control motor 23 to be started. Therefore, the rotational force for the engine 9 is transmitted only to the driven pulley 17 through the driving pulley 13 and the belt 15, without transmitting power to the input shaft 1 or the output shaft 3.

Obviously, when any gears in the shifting unit 5 are not engaged and the engine is started, it is possible to start the engine even with the clutch 35 engaged.

Figure 3:
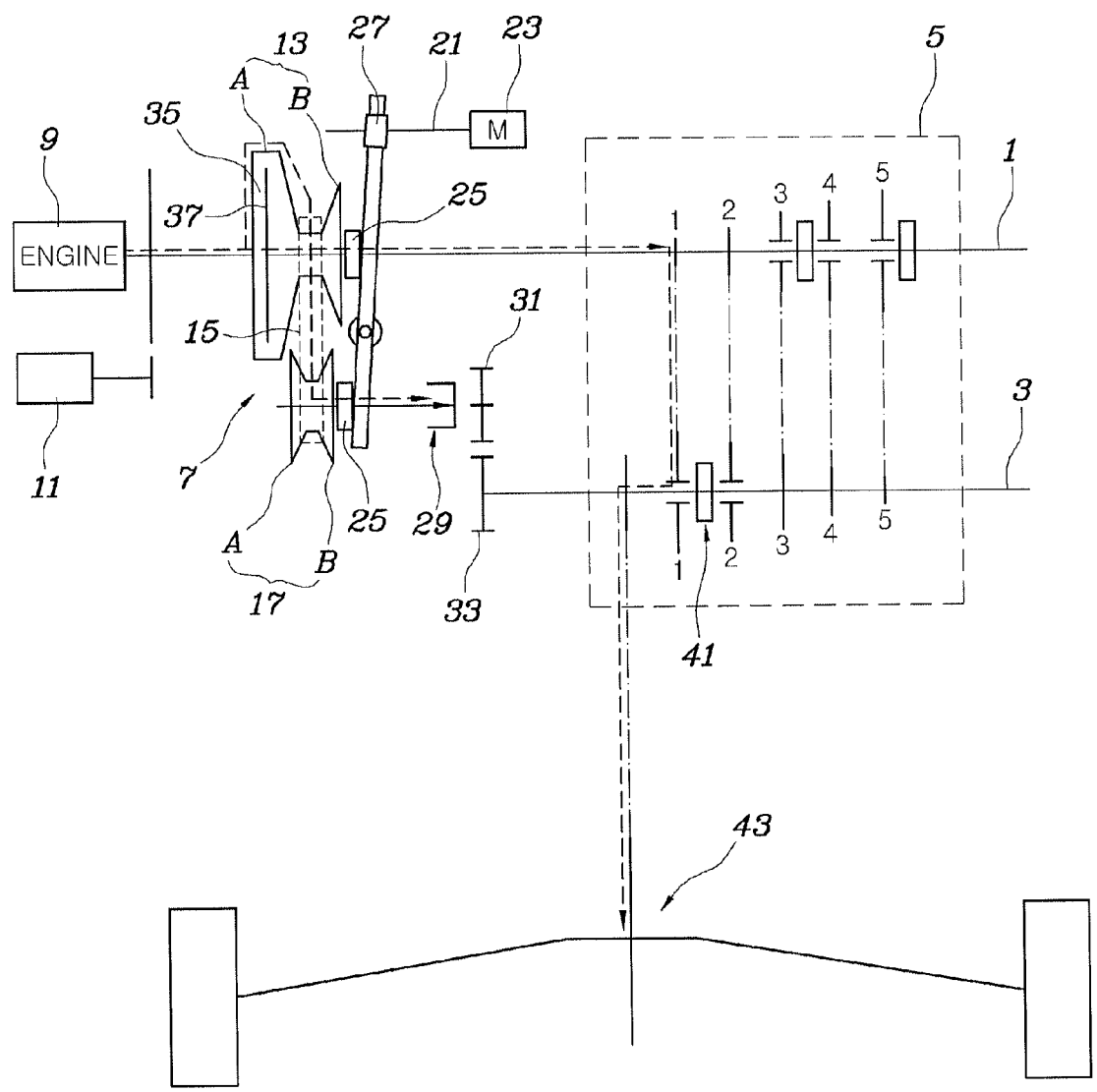
FIG. 3 is a view illustrating power transmission when a vehicle travels with the first stage in FIG. 1.

In the state described above, when the clutch 35 is disengaged, the first stage can be engaged by a first-second stage synchro-engaging device 41 so that it is possible to implement the first stage-traveling state, as shown in FIG. 3, while driving the vehicle, by engaging the clutch 35.

In FIG. 3, the power from the engine 9 is transmitted to the output shaft 3 through a pair of first stage gears while the transmission is shifted to the first stage after being transmitted to the input shaft 1 through the clutch 35, and then is transmitted to the driving wheels through a differential gear 43.

In this process, the power control mechanism 29 keeps disengaged so that the power is not transmitted to the output shaft 3 through the driving pulley 13 and the driven pulley 17.

FIG. 4 shows an intermediate process that the transmission is shifted from the first stage to the second stage, in which the power from the engine 9 is transmitted to the output shaft 3 through the driving pulley 13, the belt 15, and the driven pulley 17 even while not transmitted to the input shaft in order to prevent reduction of torque by disengaging the clutch 35 and engaging the power control mechanism 29.

In this process, the pulley ratios between the belt 15 and the driving and driven pulleys 13, 17 is adjusted from when the driven pulley 17 can meet the rotational speed of the output shaft 3 in the first stage to when it can meet the rotational speed of the output shaft 3 in the second stage, in which the pulley ratios described above is controlled with the control lever 19 by operating the control motor 23 so that it is possible to prevent reduction of torque due to cutting of torque to the input shaft 1 by the clutch and achieve smooth shifting from the current stage to the desire stage while the transmission is shifted from the first stage to the second stage.

While the clutch 35 is disengaged, the power control mechanism 29 is engaged, and the power from the engine 9 is supplied to the output shaft 3 through the driving pulley 13 and the driven pulley 17, as described above, the first-second stage synchro-mesh device 41 disengages the first stage and engages the second stage.

As described above, as the clutch 35 is engaged and the power control mechanism 29 is disengaged after the second stage is engaged, the second stage-traveling state shown in FIG. 5 is implemented.

In FIG. 5, the power from the engine 9 is adjusted to the second stage between the input shaft 1 and the output shaft 3 through the clutch 35 and supplied to the driving wheels through the differential gear 43 and the power transmitted to the driven pulley 17 from the engine 9 has been cut by the power control mechanism 29.

As described above, power that is continuously supplied to the output shaft 3 by the driving pulley 13, the belt 15, and the driven pulley 17 while the transmission is shifted from the first stage to the second stage is supplied in the same way when the transmission is shifted between the other stages and it is possible to meet the rotational speed of the output shaft 3 at the current stage and a desired stage and compensate power between the driving pulley 13 and the driven pulley 17 even when shifting between the high stages such as the fourth stage and the fifth stage and shifting to an overdrive stage, particularly in addition to shifting between low stages such as the first stage and the second stage so that it is possible to prevent reduction of torque in shifting throughout the overall shifting range of the transmission and achieve smooth and stable shifting.

Meanwhile, FIG. 6 shows power transmission when a vehicle moves back, in which the stage for reverse is implemented by engaging the reverse idler gear 39 between the input shaft 1 and the output shaft 3, with the vehicle stopped.

According to an exemplary embodiment of the present invention, it is possible to improve the commercial value of a vehicle by preventing non-smooth shifting to achieve smooth and stable shifting response, by allowing specific power to be transmitted to the driving wheels in shifting while using the mechanism of a manual transmission, which necessarily connects power after instantaneously cutting the power for shifting in the related art, to prevent reduction of torque generated in shifting.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission apparatus for a vehicle, comprising:
   a shifting unit equipped with a plurality of shifting mechanisms that implement different gear ratios between an input shaft and an output shaft; and
   a continuous transmission mechanism that is disposed between the output shaft and a power supply, wherein the continuous transmission mechanism selectively supplies power to the input shaft of the shifting unit and selectively transmits power from the power supply to the output shaft with a continuous transmission gear ratio,
   wherein the continuous transmission mechanism includes:
      a driving pulley connected to the power supply;
      a belt engaged to the driving pulley and transmitting a rotational force of the driving pulley;
      a driven pulley engaged to the belt and receiving the rotational force from the driving pulley through the belt; and
      a pulley ratio-changing unit that continuously changes the diameter of the driving pulley and the diameter of the driven pulley which are in contact with the belt,
   wherein a clutch that selectively transmits the power from the power supply to the input shaft is disposed between the input shaft and the power supply, and
   wherein the clutch has a clutch disc disposed inside the driving pulley to control the power from the power supply.

2. The automated manual transmission apparatus of claim 1, wherein a power control mechanism is disposed between the driven pulley and the output shaft to connect or cut the power.

3. The automated manual transmission apparatus of claim 2, wherein a driving gear transmitting the power to the output shaft is fitted on a first rotary shaft of the driven pulley,
   a driven gear fitted on the output shaft is engaged with the driving gear, and
   the power control mechanism connects or cuts the power between the driven pulley and the driving gear, on the first rotary shaft of the driven pulley.

4. The automated manual transmission apparatus of claim 1, wherein the driving pulley and the driven pulley respectively include a pair of a fixed pulley that is restricted in an axial movement thereof and a movable pulley that is allowed to move in an axial direction thereof with respect to the corresponding fixed pulley, and
   the pulley ratio-changing unit continuously changes the diameters of the driving pulley and the driven pulley that are in contact with the belt by moving each movable pulley of the driving pulley and the driven pulley along the axial direction of the each movable pulley.

5. The automated manual transmission apparatus of claim 4, wherein the pulley ratio-changing unit includes:
   a control lever that has a second rotary shaft between the driving pulley and the driven pulley and moves the each movable pulley of the driving pulley and the driven pulley along the axial direction thereof while rotating about the second rotary shaft;
   a feed screw that is engaged with the control lever and moves the control lever about the second rotary shaft; and
   a control motor that is fixed to the feed screw and rotates the feed screw.

6. The automated manual transmission apparatus of claim 1, wherein each of the shifting mechanisms of the shifting unit is implemented by a synchro-mesh shifting mechanism in which the each of the shifting mechanisms is engaged after synchronization by using a key and a synchronizer ring.

7. The automated manual transmission apparatus of claim 1, wherein each of the shifting mechanisms of the shifting unit is implemented by a dog clutch.

* * * * *